(12) United States Patent
Herrera

(10) Patent No.: US 8,465,058 B1
(45) Date of Patent: Jun. 18, 2013

(54) SPRUNG MUD FLAP DEVICE

(76) Inventor: Mario A. Herrera, San Pablo, CA (US)

( * ) Notice: Subject to any disclaimer, the term of this patent is extended or adjusted under 35 U.S.C. 154(b) by 20 days.

(21) Appl. No.: 13/233,899

(22) Filed: Sep. 15, 2011

(51) Int. Cl.
*B62D 25/18* (2006.01)

(52) U.S. Cl.
USPC .......................................... 280/847; 280/851

(58) Field of Classification Search
USPC .......... 280/154, 847, 848, 849, 851; D12/181
See application file for complete search history.

(56) References Cited

U.S. PATENT DOCUMENTS

| | | | |
|---|---|---|---|
| 3,954,281 A | 5/1976 | Juergens | |
| 4,033,599 A | 7/1977 | Fusco | |
| 4,695,070 A * | 9/1987 | Knox | 280/851 |
| 6,604,724 B2 | 8/2003 | Hawes et al. | |
| 6,799,808 B1 | 10/2004 | Walters | |
| 7,475,911 B2 * | 1/2009 | Edwards | 280/851 |

* cited by examiner

*Primary Examiner* — John Walters
*Assistant Examiner* — James Triggs

(57) ABSTRACT

The sprung mud flap device provides a sprung connection between a truck or trailer mount plate and a flap assembly. The device negates damages often incurred when a truck or trailer is backed into a berm or other obstacle and the mud flaps damaged by forces between the tires and the berm or obstacle. By allowing the flap to move, move downward, forward, or rearward, and to flex away from the mount plate fastened to a truck or trailer, the flap is not stressed, torn, or excessively worn. The device includes a rain shield. The rain shield includes a rearward angle. The mount plate includes a forward angle. The device includes a rearward angle on the rain shield. The device includes a u-channel as a part of the flap assembly.

2 Claims, 5 Drawing Sheets

SPRUNG MUD FLAP DEVICE

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

TO ALL WHOM IT MAY CONCERN

Be it known that I, Mario A. Herrera, a citizen of the United States, have invented new and useful improvements in a sprung mud flap device as described in this specification.

BACKGROUND OF THE INVENTION

Mud flaps are a requirement on many trucks and on large trailers and commercial trailers, such as those pulled by tractors. Damaged mud flaps cause problems in replacement costs and labor. Damaged mud flaps also result in traffic citations. Oftentimes mud flaps are damaged from the trailer being backed into concrete berms and other separation media and blocks, for example. When a trailer is backed into the berms, downward pressure is exerted on the mud flaps by the tires and the barrier. This pressure and contact is quite destructive to the mud flaps. What has been needed is a mud flap that does not incur this damage. The present invention provides this.

FIELD OF THE INVENTION

The sprung mud flap device relates to mud flaps such as those used on tractor trailers.

SUMMARY OF THE INVENTION

The general purpose of the sprung mud flap device, described subsequently in greater detail, is to provide a sprung mud flap device which has many novel features that result in an improved sprung mud flap device which is not anticipated, rendered obvious, suggested, or even implied by prior art, either alone or in combination thereof.

To attain this, the sprung mud flap device provides a sprung connection between a truck or trailer mount plate and a flap assembly. The device negates damages often incurred when a truck or trailer is backed into a berm or other obstacle and the mud flaps damaged by forces between the tires and the berm or obstacle. By allowing the flap to move, move downward, forward, or rearward, and to flex away from the mount plate fastened to a truck or trailer, the flap is not stressed, torn, or excessively worn. The most complete device may include a rain shield. The rain shield may include a rearward angle. The most complete device may include a mount plate forward angle. The most complete device may include a rearward angle on the rain shield. The most complete device may include a u-channel as a part of the flap assembly.

Importantly, the device may disassemble into its individual components, thereby allowing part replacement versus complete device replacement.

Thus has been broadly outlined the more important features of the improved sprung mud flap device so that the detailed description thereof that follows may be better understood and in order that the present contribution to the art may be better appreciated.

An object of the sprung mud flap device is to provide a mud flap that resists damage.

Another object of the sprung mud flap device is to provide a mud flap that negates damage when backing into a berm.

A further object of the sprung mud flap device is to provide a mud flap that is especially effective in rainy conditions.

An added object of the sprung mud flap device is to provide an easily attachable mud flap.

Another object of the sprung mud flap device is to provide a device whose components are easily separately replaced.

These together with additional objects, features and advantages of the improved sprung mud flap device will be readily apparent to those of ordinary skill in the art upon reading the following detailed description of presently preferred, but nonetheless illustrative, embodiments of the improved sprung mud flap device when taken in conjunction with the accompanying drawings.

DETAILED DESCRIPTION OF THE DRAWINGS

With reference now to the drawings, and in particular FIGS. 1 through 5 thereof, the principles and concepts of the sprung mud flap device generally designated by the reference number 10 will be described.

Figure 2:
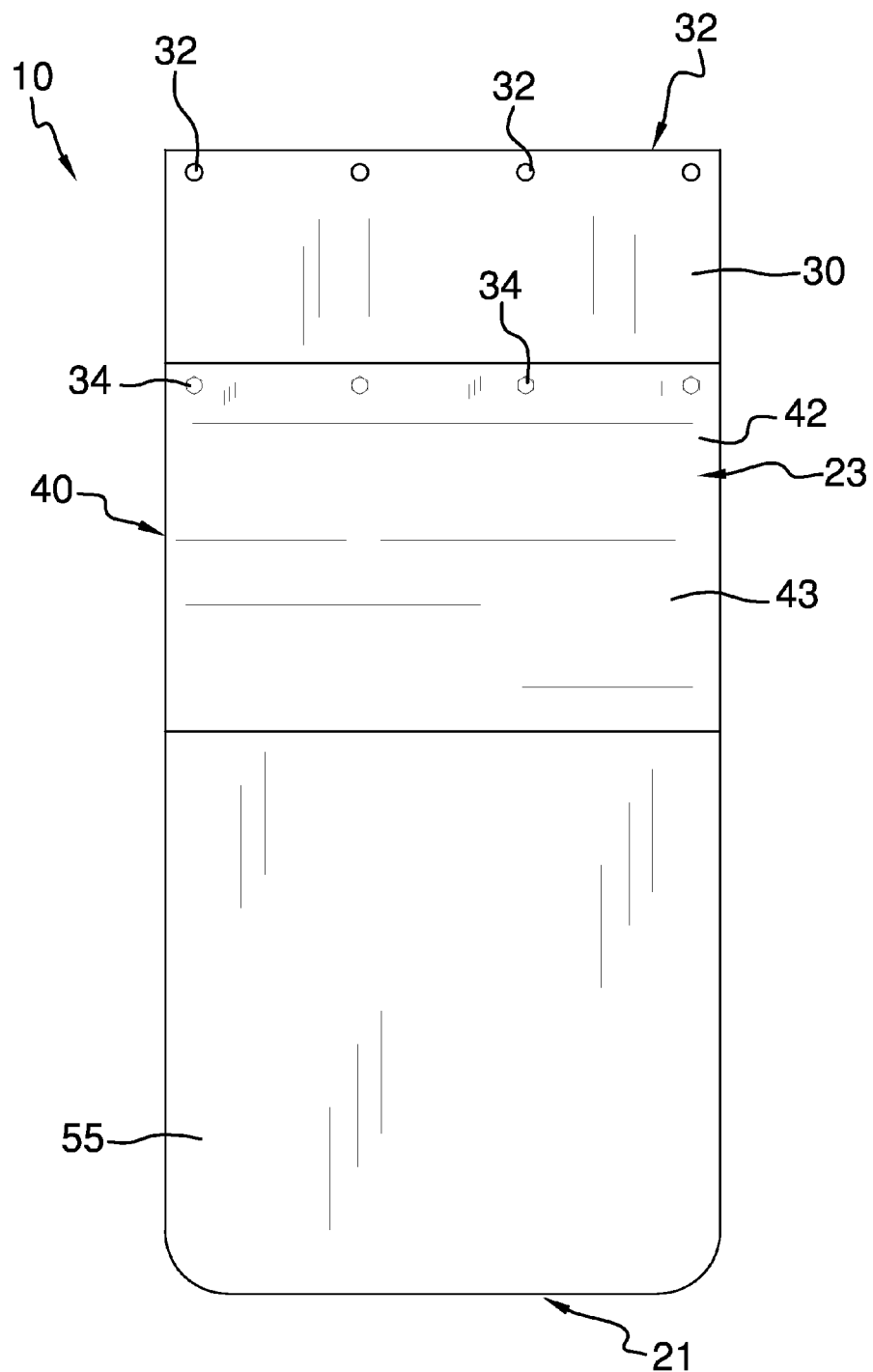
FIG. 2 is a rear elevation view.

Referring to FIG. 2, the device 10 partially comprises a top 20 spaced apart from a bottom 21, and a front 22 and a rear 23.

Figure 1:
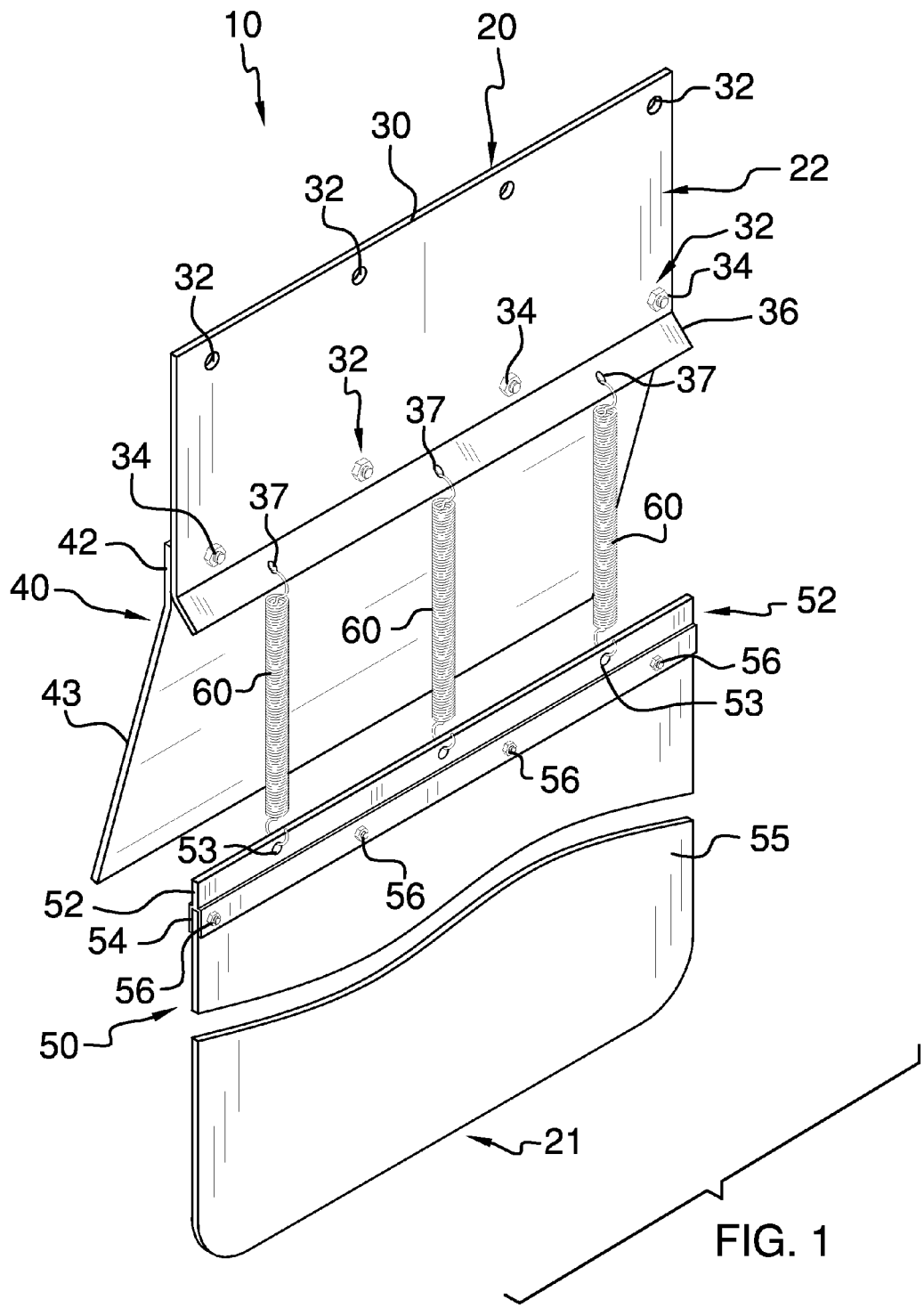
FIG. 1 is a front perspective view.

Referring to FIG. 1, the vertically disposed mount plate 30 begins at the top 20. The forward angle 36 is disposed downwardly on the mount plate 30. The plurality of spaced apart plate orifices 32 is disposed in the mount plate 30 top 20. The plurality of spaced apart plate orifices 32 is disposed downwardly in the mount plate 30. The downwardly disposed plate orifices 32 are adjacent to the forward angle 36. A at least three spaced apart spring orifices 37 are disposed in the forward angle 36. More spring orifices 37 may be chosen. The rain shield 40 has an upwardly disposed vertical section 42 affixed to a rearward angle 43. The vertical section 42 is fastened to the downwardly disposed plate orifices 32 by fasteners 34. The flap assembly 50 comprises an upper attachment 52 affixed to a u-channel 54. At least three spaced apart attachment orifices 53 are disposed in the upper attachment 52. More attachment orifices 53 may be employed. The flap 55 is removably disposed within the u-channel 54.

Figure 4:
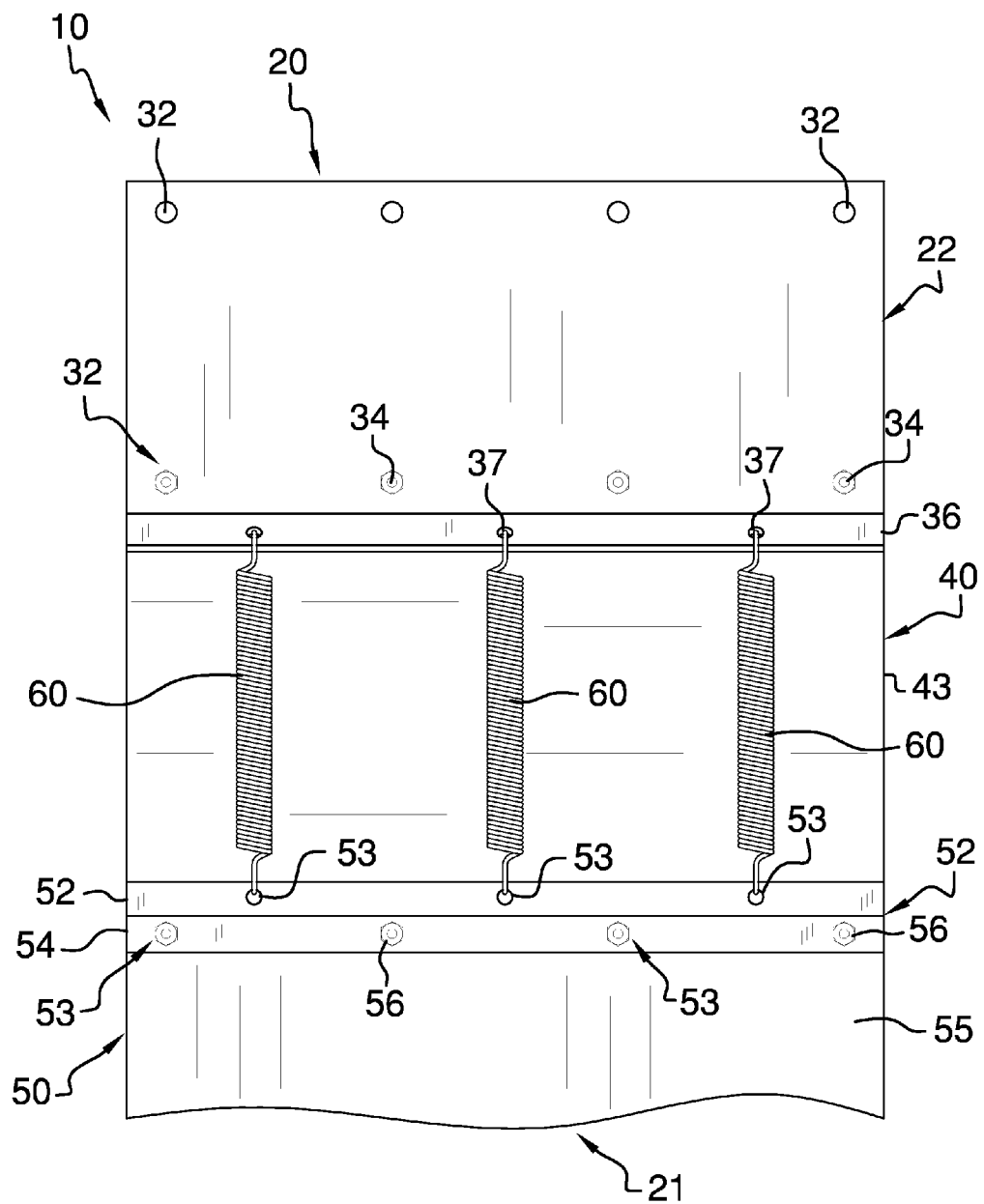
FIG. 4 is a front elevation view.

Referring to FIG. 4, the plurality of flap 55 fasteners 34 is removably affixes the flap 55 within the u-channel 54.

Figure 3:
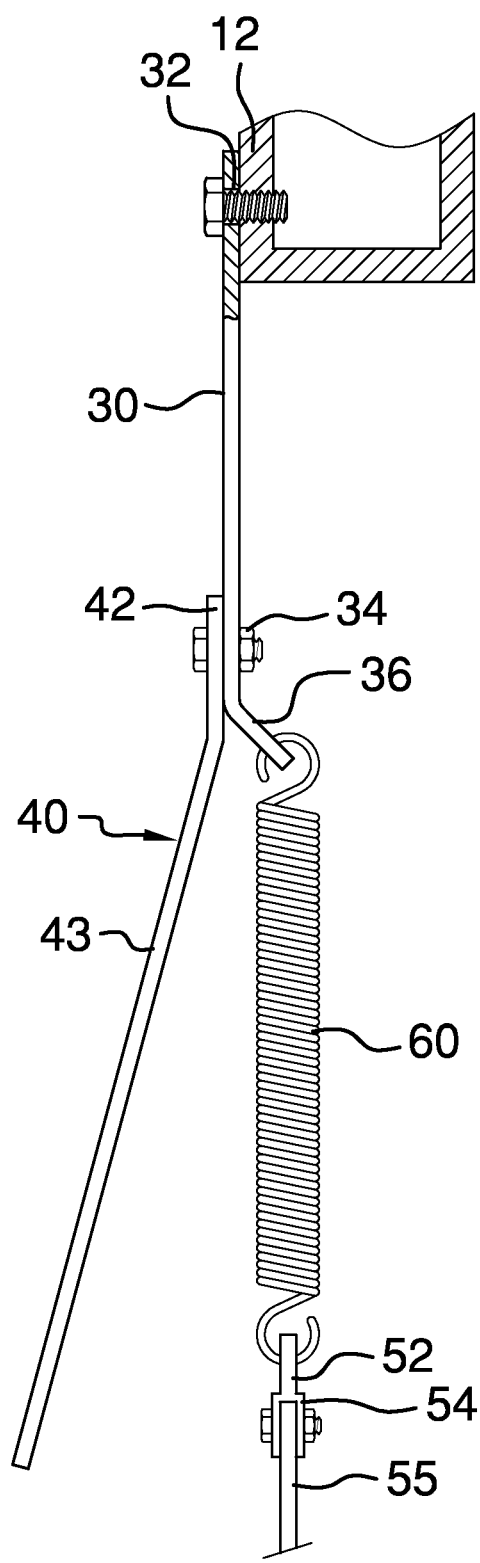
FIG. 3 is a lateral elevation view, installed.

Referring to FIG. 3 and also to FIG. 4, the plurality of expansion springs 60 removably connects the spring orifices 37 to the attachment orifices 53 of the upper attachment 52.

Referring to FIG. 3, the rain shield 40 offers significant advantage in both the overall function of the device 10 and also in shielding the expansion springs 60 to promote longer life. Additionally, the ease of replacing the expansion springs 60 provides significant advantage.

Referring to FIG. 1, significant advantage is provided by the disassembly capabilities of the device 10 so that various individual parts may be replaced without replacing the entire device 10.

Figure 5:
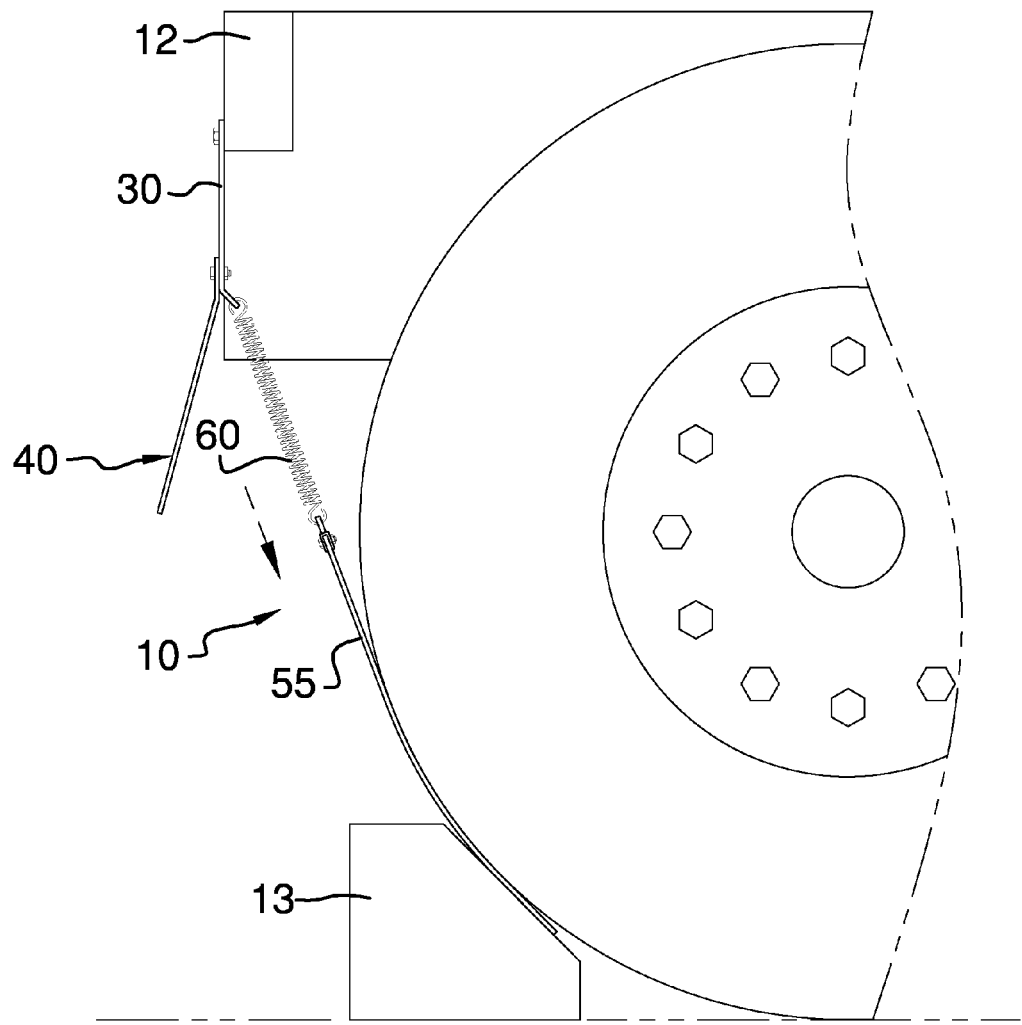
FIG. 5 is a lateral in-use elevation view.

Referring to FIG. 5, the existing trailer rear 12 has been backed into the existing berm 13. The flap 55 has therefore been pulled downwardly. The expansion springs 60 allow the flap 55 to move downwardly, instead of suffering damage.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the sprung mud flap device may be used.

What is claimed is:

1. A sprung mud flap device comprising, in combination:
    a top spaced apart from a bottom, a front and a rear;
    a vertically disposed mount plate beginning at the top;
    a plurality of spaced apart plate orifices disposed in the mount plate top;
    and at least three spaced apart spring orifices disposed downwardly in the mount plate;
    a rain shield attached downwardly to the mount plate;
    a flap assembly comprising:
        an upper attachment affixed to a u-channel;
        and at least three spaced apart attachment orifices disposed in the upper attachment;
        a flap removably disposed within the u-channel;
        a plurality of flap fasteners removably affixing the flap within the u-channel;
    a plurality of expansion springs removably connecting the spring orifices to the attachment orifices of the upper attachment, the expansion springs shielded rearwardly by the rain shield.

2. A sprung mud flap device comprising, in combination:
    a top spaced apart from a bottom, a front and a rear;
    a vertically disposed mount plate beginning at the top;
    a forward angle disposed downwardly on the vertical mount plate;
    a plurality of spaced apart plate orifices disposed in the mount plate top;
    a plurality of spaced apart plate orifices disposed downwardly in the mount plate, the downwardly disposed plate orifices adjacent to the forward angle;
    and at least three spaced apart spring orifices disposed in the forward angle;
    a rain shield having an upwardly disposed vertical section affixed to a rearward angle, the vertical section fastened to the downwardly disposed plate orifices by fasteners;
    a flap assembly comprising:
        an upper attachment affixed to a u-channel;
        and at least three spaced apart attachment orifices disposed in the upper attachment;
        a flap removably disposed within the u-channel;
        a plurality of flap fasteners removably affixing the flap within the u-channel;
    a plurality of expansion springs removably connecting the spring orifices to the attachment orifices of the upper attachment.

* * * * *